UNITED STATES PATENT OFFICE

2,441,396

ANTIDOTE FOR HEAVY METAL POISONING

Alsoph H. Corwin, Baltimore, Md., George R. Jackson, Hollywood, Fla., and James L. A. Webb, Baltimore, Md., assignors to Research Corporation, New York, N. Y., a corporation of New York No Drawing. Application January 18, 1945, Serial No. 573,464

7 Claims. (Cl. 260—144)

This invention relates to novel compounds particularly useful as antidotes for heavy metal poisoning and to methods for making such compounds.

It has been found that compounds including a sulfhydryl group attached to a carbon atom of a polyatomic chain at least one end of which is attached to an aromatic ring having an acid group attached thereto, are capable of combining with and inactivating heavy metals both in vitro and in the animal body, and of substantially ameliorating the effects of heavy metal poisoning, for example, of mercury poisoning, in the animal body. It is preferable that the carbon atom to which the sulfhydryl group is attached be in conjugated linkage with the aromatic ring. The presence of an acid group in the aromatic ring not only renders the compounds more soluble and therefore more readily useful in the treatment of heavy metal poisoning, but also renders the compounds more effective in reacting with and tying up heavy metals.

The term "aromatic ring" is intended to include heterocyclic rings of aromatic structure, such as the pyridine ring.

The conjugately linked sulfhydryl compounds of the invention are all capable of being formulated as thioketones and in the free state probably exist largely, if not entirely, in the thioketone form.

Typical of the compounds of the invention are the carboxylic acid and sulfonic acid derivatives of diphenyl thiocarbazone:

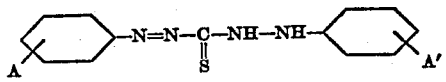

wherein A and A' represent —COOH, —SO₃H or their salts.

Metal derivatives of these compounds may be represented by the formula:

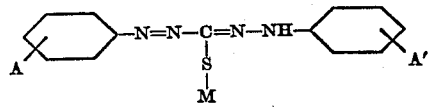

wherein M represents a monovalent metal or an equivalent proportion of a polyvalent metal.

It has been found that diphenyl thiocarbazones containing acid groups in the aromatic ring may be effectively produced by reacting the corresponding substituted phenyl hydrazines with carbon bisulfide in an anhydrous basic liquid such as pyridine or liquid ammonia.

The following examples illustrate methods of preparing typical compounds of the invention.

Di-(m-carboxyphenyl) thiocarbazone

Five grams (0.033 mole) of finely divided m-hydrazinobenzoic acid is suspended with stirring in 30 cc. pyridine. After cooling to 20° C., 1.05 cc. (0.033 mole) of CS₂ is added dropwise still with stirring. The mixture is stirred for fifteen minutes at least, at this temperature, and then placed on a steam bath and heated to 95° until there is a color change to light straw color or until no more H₂S is evolved. This point is easily recognized as heating beyond it will cause distinct deepening of the coloration. The mixture is evaporated under reduced pressure until only a thick syrup remains. The pyridine may be recovered if desired and used in subsequent preparations. To this syrup is then added either (1) 15 cc. water or (2) 15 cc. of a 50% alcohol-water solution, either being followed by a solution made from 3 g. sodium hydroxide in 10 cc. water. The resulting mixture is heated on the steam bath for ten to fifteen minutes with stirring, cooled to below 15°, diluted with about four times its volume of water and precipitated with vigorous stirring by slow addition of 2-N sulfuric acid. The precipitate is separated by centrifuging and washed by centrifuging with water two times. The solid is dissolved in a minimum amount of 5 N ammonia solution, filtered and after dilution to approximately 150 cc. precipitated again, with stirring, with 2-N sulfuric acid. The precipitate is washed by centrifuging with water twice and the above reprecipitation repeated. Washing by centrifuging is continued until the solid tends to become colloidal, as is indicated by the color of the supernatant liquid after centrifuging. This will require about three or four washings. The supernatant liquid is poured off and the solid filtered with suction to a heavy solid paste which is dried over sulfuric acid. Yield: 2.0–2.5 g. Solutions for injection may be made from this material by dissolving in excess sodium hydroxide and adjusting the pH with hydrochloric acid to blood pH.

Di-(p-phenylsulfonic acid) thiocarbazone

One mole of p-hydrazinobenzenesulfonic acid is dissolved in sufficient liquid ammonia to dissolve it and with stirring one mole of CS₂ is added. Stirring is continued for one hour and the ammonia solution is then poured into a porcelain evaporating dish, or a mortar, and allowed to evaporate. The resulting sticky mass is heated on the steam cone and worked with a stirring rod or the pestle until it becomes granular. On continued heating, or standing at room temperature for a sufficient time, $H_2S$ is given off with the formation of the corresponding carbazide. This carbazide on dissolving in a base such as sodium hydroxide solution spontaneously oxidizes to the highly colored carbazone.

Di-(carboxyaryl) thiocarbazones, for example, the meta and para phenyl carboxylic acid derivatives, may also be made in ammonia by substituting meta- or para-hydrazino-benzene carboxylic acid for the sulfonic acid in the last example.

As an example of the effectiveness of these compounds, it has been found that if mice have been given an intraperitoneal dose of a heavy metal sufficient to cause 100% fatalities at constant temperature they will recover to the extent of 95 to 100%, if treated with intraperitoneal injections of di-(m-carboxyphenyl) thiocarbazone injected over a five-hour period in five doses each consisting of $2 \times 10^{-5}$ mole of the thiocarbazone in 0.4 cc. aqueous solution at pH 7.4.

We claim:

1. A compound of the general formula

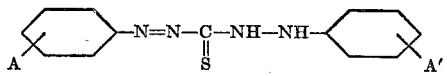

wherein A and A' represent an acid group selected from sulfonic and carboxylic acid and salts thereof.

2. Di-(carboxyphenyl) thiocarbazones and salts thereof.

3. Di-(sulfophenyl) thiocarbazones and salts thereof.

4. In the production of compounds of the general formula

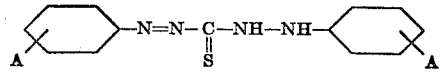

wherein A represents an acid group the step which comprises reacting an aryl hydrazine of the formula

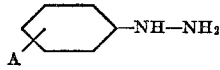

wherein A represents an acid group selected from sulfonic and carboxylic acid with carbon bisulfide in an anhydrous basic liquid medium.

5. In the production of di-(carboxyphenyl) thiocarbazones the step which comprises reacting a phenyl hydrazine carboxylic acid with carbon bisulfide in pyridine.

6. In the production of di-(sulfophenyl) thiocarbazones the step which comprises reacting a phenyl hydrazine sulfonic acid with carbon bisulfide in liquid ammonia.

7. Di-(m-carboxyphenyl) thiocarbazone and salts thereof.

ALSOPH H. CORWIN.
GEORGE R. JACKSON.
JAMES L. A. WEBB.

REFERENCES CITED

The following references are of record in the file of this patent:

UNITED STATES PATENTS

| Number | Name | Date |
|---|---|---|
| 1,440,962 | Cadwell | Jan. 2, 1923 |
| 1,673,498 | Dyson et al. | June 12, 1928 |
| 2,018,644 | Williams et al. | Oct. 22, 1935 |
| 2,061,243 | Lubs et al. | Nov. 17, 1936 |
| 2,106,552 | Jenkins et al. | Jan. 25, 1938 |
| 2,139,697 | Salzberg | Dec. 13, 1938 |
| 2,145,808 | Sibley | Jan. 31, 1939 |
| 2,170,059 | Mathes | Aug. 22, 1939 |
| 2,172,856 | Simons | Sept. 12, 1939 |
| 2,173,732 | Sebrell et al. | Sept. 19, 1939 |
| 2,204,230 | Rossander et al. | June 11, 1940 |
| 2,228,415 | Sparks et al. | Jan. 14, 1941 |
| 2,283,817 | Martin et al. | May 19, 1942 |
| 2,304,624 | Burke | Dec. 8, 1942 |
| 2,334,711 | Kendall et al. | Nov. 23, 1943 |
| 2,340,650 | Dean | Feb. 1, 1944 |
| 2,342,481 | Muller | Feb. 22, 1944 |
| 2,369,657 | Brooker et al. | Feb. 20, 1945 |

FOREIGN PATENTS

| Number | Country | Date |
|---|---|---|
| 330,583 | Great Britain | June 10, 1930 |

OTHER REFERENCES

Chemical Abstracts, vol. 31, page 6214, (1927).
Richter, G. H. Textbook of Organic Chemistry (1938), page 376.
Billman, J. Chem. Soc., vol. 65, page 1300 (July 1943).